(12) United States Patent
Bernt et al.

(10) Patent No.: US 9,914,859 B2
(45) Date of Patent: Mar. 13, 2018

(54) METHOD FOR MOLDING A BODY IN A MOLD

(71) Applicant: TESA SE, Norderstedt (DE)

(72) Inventors: Stephan Bernt, Hamburg (DE); Patrick Kerep, Hamburg (DE)

(73) Assignee: TESA SE, Norderstedt (DE)

( * ) Notice: Subject to any disclaimer, the term of this patent is extended or adjusted under 35 U.S.C. 154(b) by 0 days.

(21) Appl. No.: 15/326,891

(22) PCT Filed: Jul. 14, 2015

(86) PCT No.: PCT/EP2015/066065
§ 371 (c)(1),
(2) Date: Jan. 17, 2017

(87) PCT Pub. No.: WO2016/015997
PCT Pub. Date: Feb. 4, 2016

(65) Prior Publication Data
US 2017/0210953 A1  Jul. 27, 2017

(30) Foreign Application Priority Data

Jul. 31, 2014 (DE) .................. 10 2014 215 079

(51) Int. Cl.
| | |
|---|---|
| C09J 133/08 | (2006.01) |
| B29C 33/68 | (2006.01) |
| C09J 7/02 | (2006.01) |
| B29C 70/34 | (2006.01) |
| B29K 105/00 | (2006.01) |
| B29K 33/04 | (2006.01) |
| B29K 627/18 | (2006.01) |
| B29K 309/08 | (2006.01) |

(52) U.S. Cl.
CPC ............. C09J 133/08 (2013.01); B29C 33/68 (2013.01); B29C 70/342 (2013.01);
(Continued)

(58) Field of Classification Search
CPC ......... B29C 33/56; B29C 33/58; B29C 33/60; B29C 33/62; B29C 33/68; C09J 133/08
See application file for complete search history.

(56) References Cited

U.S. PATENT DOCUMENTS

| | | |
|---|---|---|
| 4,279,541 A | 7/1981 | Bruhn et al. |
| 2004/0097638 A1 | 5/2004 | Centner et al. |

(Continued)

FOREIGN PATENT DOCUMENTS

| | | |
|---|---|---|
| DE | 28 16 090 A1 | 10/1978 |
| DE | 10 2013 221 847 A1 | 2/2015 |

(Continued)

OTHER PUBLICATIONS

International Search Report dated Sep. 23, 2015, mailed Sep. 30, 2015.
(Continued)

*Primary Examiner* — Vu A Nguyen
(74) *Attorney, Agent, or Firm* — Norris McLaughlin & Marcus P.A.

(57) ABSTRACT

Method for molding a body in a mold, comprising the following steps: applying an adhesive tape to the inside of a mold, distributing the layers of material forming the body over the adhesive tape, curing the layers of material, removing the body from the mold, where the adhesive tape has a backing on one side of which a self-adhesive has been applied in the form of a polymer mixture, the polymers being constructed of 60 to 99.5 wt % of n-butyl acrylate and/or 2-ethylhexyl acrylate, 0.5 to 10 wt % of an ethylenically unsaturated monomer having an acid or acid-anhydride function, 0 to 30 wt % of one or more olefinic monomers and the self-adhesive comprises between 0 and 60 parts by weight of one or more tackifiers.

19 Claims, 3 Drawing Sheets (52) U.S. Cl.
CPC ......... *C09J 7/0267* (2013.01); *B29K 2033/04* (2013.01); *B29K 2105/0097* (2013.01); *B29K 2309/08* (2013.01); *B29K 2627/18* (2013.01); *C09J 2427/006* (2013.01); *C09J 2433/00* (2013.01)

(56) References Cited

U.S. PATENT DOCUMENTS

2015/0166748 A1   6/2015  Schibsbye
2016/0158971 A1   6/2016  Bernt et al.

FOREIGN PATENT DOCUMENTS

| EP | 1 378 527 B1 | 11/2008 | |
| EP | 2 388 131 A1 | 11/2011 | |
| FR | 2 388 658 A1 | 11/1978 | |
| GB | 1590593 A * | 6/1981 | ............. B29C 33/68 |

OTHER PUBLICATIONS

English translation of International Search Report dated Sep. 23, 2015, mailed Sep. 30, 2015.
German Search Report corresponds to German Application No. 10 2014 215 079.5 dated Mar. 2, 2015.

* cited by examiner

METHOD FOR MOLDING A BODY IN A MOLD

This is a 371 of PCT/EP2015/066065 filed 14 Jul. 2015, which claims foreign priority benefit under 35 U.S.C. 119 of German Patent Application 10 2014 215 079.5 filed Jul. 31, 2014, the entire contents of which are incorporated herein by reference.

The present invention relates to a method for molding a body in a mold in which said body is molded from a plurality of curable material layers, particularly a half blade of a rotor that is installed in a wind turbine.

BACKGROUND OF THE INVENTION

Numerous components, some having complex geometric structures, are produced by placing curable materials such as epoxy or polyester resins in a mold and then curing the material.

Examples of such processes are RTM (resin transfer molding) and VRTM (vacuum-assisted resin transfer molding). Resin transfer molding is a method for the production of molded parts from thermosets and elastomers. In this method, in contrast to the pressing process, the molding compound is injected using a plunger from a usually heated prechamber via distribution channels into the mold cavity, where it is cured under application of heat and pressure. Formaldehyde resins (phenol resins or aminoplast resins) and reactive resins (polyesters such as PET or epoxy resins) with small filler particles and elastomers can be used as molding compounds.

At the start of a cycle, the prechamber contains a preplasticized and dosed molding compound. The mold is first closed. The molding compound is then injected into the mold and left therein for a specified period. During this period, referred to as the residence time, the molding compound is reacted or vulcanized. The residence time depends on a variety of factors (resin type, filler, processing time, and temperature). When the residence time is completed, the mold can be opened. The previous filled molding compound is now solid (cured) and is now referred to as the molded part. The molded part can now be removed from the mold. This is followed by cleaning of the mold, and a new cycle can then begin.

In this case, the amount of the molding compound required for pressing and repressing should always be greater than the volume of the final molded part so that the mold is completely filled. This ensures that the molded part will be fully formed and that no air will be included. The excess molding compound remaining in the prechamber, also referred to as the residual cake, must be removed before the start of the new cycle and replaced by fresh molding compound.

In order to prevent air inclusions, the cavity (mold cavity) is usually evacuated.

In processing of long fibers or semifinished fiber materials as well (prewovens/preforms), said fiber materials are first placed in the mold and then overmolded with the molding compound. In this case as well, it is generally preferable to additionally evacuate the cavity (mold cavity).

"Prewoven methods" can be classified according to the number and configuration of resin injections. In the following, insertion of the resin into the semifinished fiber material is referred to as injection, regardless of how the pressure gradient is produced.

Point injection: The resin is injected at only one site into the semifinished material. In point injection, the flow front may include air, which leads to flaws.

Multiple point injection: The mold can be filled with resin more quickly when multiple injection sites are used. Inclusion of air can be prevented by skilled positioning.

Line injection: In line injection, injection is carried out linearly on the edge of the mold instead of at one point. This can be advantageous in the case of highly elongated components, as the material must flow only through the shorter edge length.

Flow canal injection: The resin is injected via a broad channel located above or below the semifinished fiber material.

Cascade injection: In order to keep the pressure gradient low, multiple injection sites are configured in the direction of the flow front. In this process, however, it is necessary to open and close the injection tubes along the flow front.

Known mold types are hard molds, soft molds, and mixed molds.

Resins having a low viscosity are used as injection resins. This keeps flow resistance during flowing through the mold low and means that smaller differences in pressure are needed for filling. Reactive resins for RTM methods are sold as special injection resins composed of a resin and curing components. Low-reactivity resin systems can be mixed prior to injection. When high-reactivity resin systems are used, the resin and curing agents can only be mixed directly in the infusion line or in the mold. This makes shorter cycle times possible. Methods in which the injection resin components are not mixed until immediately before injection are known as RIM (reaction injection molding) methods.

Further details can be found in Rompp's Chemistry Lexicon, specifically under the entry "Injection molding" (2013, Georg Thieme Publishing House, document ID No. RD-19-03499, last updated: July 2011).

For constructing a piece, for example the (half) blade of a rotor installed in a wind turbine, glass fiber mats are used that are inserted as partial layers into a suitably configured mold. After this, the layers are bonded with a resin and cured in the mold to produce a fiber-reinforced polymer or a glass fiber-reinforced plastic.

In order to ensure simple and non-destructive demolding, the mold, which constitutes the negative and optionally also the positive impression of the body to be constructed, must be prepared with an anti-adhesive material that is applied to the mold before forming the layers.

Release agents such as polyvinyl alcohol or silicone waxes are frequently used for this purpose. Release agents based on silane or siloxane, such as the products of the Frekote series produced by Henkel, are also known. Moreover, PTFE-coated glass fabric is used that is applied to the mold in the form of an adhesive tape and replaces the release agent.

The release agent is applied in a homogeneous layer, and this layer must be absolutely smooth so that the outer surface of the body is also smooth.

Conventionally-used liquid release agents are solvent-based and require drying and curing times of 20 to 30 min each. The application of the release agent also takes 20 to 30 min.

Depending on the user, new release agents must again be provided before each production cycle, thus resulting in a downtime of 1.5 h before each cycle.

Another drawback is that the release agents are partially transferred to the component, which makes immediately following further processing, such as coating, difficult. The release agent must first be removed, which also takes time.

It also known that the separating effect of such release agents is not 100%. Because the resin has no direct contact with the mold, a small amount of resin is deposited in some areas after each additional demolding cycle. This effect is so strongly cumulative that in severe cases, the mold has to be ground and polished after 200 cycles, as the demolded components otherwise will no longer have the required accuracy of fit.

Some of the release agents used are based on organic solvents, which evaporate on drying and contaminate the ambient air. In certain cases, extra safety measures must be taken for this reason in order to minimize the risk of fire or explosion and health hazards.

One alternative that is not widespread is the method of lining the component with PTFE-coated (glass) fabric adhesive tapes. Depending on their quality, such tapes do not have to be replaced as often and show favorable release. This primarily saves time, which can be used for further production cycles.

The process of applying the fabric adhesive tape in three-dimensional form is disadvantageous because care must be taken to prevent, to the extent possible, the formation of irregularities such as air bubbles under the adhesive tape, as well as the formation of overlapping adhesive tape edges or wrinkles.

This is made extremely difficult by the stiffness and poor flexibility of the PTFE-treated glass fabric carrier.

In the production of a PTFE-coated fabric, an extremely wide bale is ordinarily moistened on its upper and lower sides with PTFE and then later cut into multiple rolls of the desired width. This leaves no PTFE on the cut edges of the rolls. This in turn has the result that the fabric and thus the adhesive tape in the mold become saturated with liquid resin, causing a reduction in the separating effect or the number of cycles required before the tape must be completely replaced.

There are considerable differences in the quality of PTFE-treated glass fabric carriers. It is virtually impossible to prevent so-called microtears in the PTFE layer, into which the resin can penetrate. The frequency of occurrence of the tears depends on quality. These tears cause the adhesive tape to become saturated with resin in the center, which leads to a reduction in service life, as discussed in the above paragraph.

The glass fiber fabric (like any fabric) also cannot be prevented from fraying at the cut edges, leaving individual fibers remaining in the mold. When the component is demolded, this causes the fiber, and partially the adhesive tape, to be torn out as well. Once a defect of this type occurs, it grows with corresponding speed, so that the resulting gap must be patched. As the newly created edges are also sensitive, this constitutes a self-deteriorating process.

A fabric adhesive tape coated with PTFE therefore also gradually loses its separating effect, so that the tape must be replaced, for example after 30 demoldings.

It is therefore a major drawback for the manufacturer of rotor blades when the adhesive tapes cannot be removed from the mold without leaving residues of the adhesive compound on the mold.

Residue-free removability of the adhesive tape is one of the essential requirements that must be met by the adhesive tape.

The adhesive compounds used are ordinarily provided with silicone adhesives. As silicone-based pressure-sensitive adhesive compounds sometimes show sharp increases in adhesive strength, strong forces develop on detachment. If the anchoring to the carrier is poor, the adhesive tape can detach from the carrier and therefore remain on the mold. The resulting residues must be removed by laborious manual means.

The increase in adhesion during storage of the adhesive composite is referred to by the person skilled in the art as an increase in bonding strength, and is caused by interactions between the adhesive and the coating substrate.

In some variants of the adhesive tape, the adhesive compound is properly anchored, but the PTFE layer detaches when the adhesive tape is removed from the glass fabric, which also results in considerable amounts of residue.

Although silicone adhesive tapes already show a favorable separating effect, the mold is also provided with a further layer of release agents before being lined with adhesive tape in order to optimize protection of the mold. After the adhesive tape, the release agent then serves as a second protective layer against penetrating resin in the event of a hole somewhere in the adhesive tape, but need be applied only once at the beginning of the process.

This also means that the adhesive tape must adhere to a substrate to which a release agent has been applied. Silicone-based adhesive compounds are well-suited for this purpose, but have the above-described drawback of sharply increasing adhesive strength in the mold during the service life of the tape, which can lead to residues or even delamination of the adhesive tape.

If the adhesive tape is extremely thin, it will tear on removal because of the high adhesive strength, prolonging the replacement process. If a thicker adhesive tape is selected, this problem is reduced. However, it also more difficult to insert thicker adhesives into 3-D molds.

The object of the present invention is to provide a method for molding a part composed of curable material layers in a mold, which is optimized with respect to its cycle steps by means of an improved adhesive tape that is used between the material layers and the mold.

This object is achieved by means of the method described in the main claim. The dependent claims relate to advantageous improvements in the subject matter of the invention.

SUMMARY OF THE INVENTION

Accordingly, the invention relates to a method for molding a body in a mold, comprising the following steps:
  application of an adhesive tape to the inside of a mold,
  distribution of the material layers forming the body on the adhesive tape,
  curing of the material layers, and
  removal of the body from the mold,
wherein the adhesive tape has a carrier film, on one side of which a self-adhesive compound is applied in the form of a polymer mixture, and wherein the polymers are composed of the following:
  (a) 60 to 99.5 wt. %, preferably 75 to 94 wt. %, and more preferably 87 to 94 wt. % of n-butyl acrylate and/or 2-ethylhexyl acrylate,
  (b) 0.5 to 10 wt. %, preferably 1 to 5 wt. %, and more preferably 1 to 3 wt. % of an ethylenically unsaturated monomer with an acid or acid anhydride functional group, and
  (c) 0 to 30 wt. %, preferably 5 to 20 wt. %, and more preferably 5 to 10 wt. % of one or a plurality of (a) various olefin monomers, and the self-adhesive compound contains 0 to 60 parts by weight of one or a plurality of tackifiers (based on the mass of the polymer mixture).

In the composition of the self-adhesive compound, the aforementioned polymer mixture always has the highest content by weight; the content by weight of any other component, such as adhesive resin, etc., is always less than the content by weight of the polymer mixture. Advantageously, moreover, the content by weight of the polymer is always greater than the total content by weight of the other components (if one or more aggregates are added).

DETAILED DESCRIPTION

The adhesive compound is a self-adhesive compound, also referred to as a pressure-sensitive adhesive, i.e., an adhesive compound that allows permanent bonding to virtually all adhesion substrates with relatively light pressure and after use can again be detached from the adhesion substrate with virtually no resistance. A pressure-sensitive has a permanently tacky effect at room temperature, i.e. shows sufficiently low viscosity and high initial tack, so that it moistens the surface of the respective adhesive substrate on application of light pressure. The bondability of the adhesive compound is based on its adhesive properties, and its detachability is based on its cohesive properties.

The production and processing of the pressure-sensitive adhesives can be carried out from a solution, a dispersion, or the melt. Preferred production and processing methods are carried out from a solution or dispersion.

According to a preferred variant of the method, the inside of the mold is equipped with a release agent before application of the adhesive tape.

Curing of the material layers also preferably takes place in a vacuum.

The individual process steps are explained more comprehensively, for example, in EP 2388131 A1.

Monomer (a) is preferably composed of a mixture of 2-ethylhexyl acrylate and n-butyl acrylate.

Suitable examples of monomer (b) include acrylic acid, methacrylic acid, itaconic acid, maleic acid, fumaric acid and/or maleic acid anhydride.

Preferred are acrylic acid or methacrylic acid, optionally a mixture of the two, and particularly preferably acrylic acid.

Monomers (c) include alkyl(meth)acrylates, preferably $C_1$ to $C_{20}$ alkyl(meth)acrylates other than the monomers making up (a), $C_1$ to $C_{10}$ hydroxyalkyl(meth)acrylates, such as in particular hydroxyethyl or hydroxypropyl(meth)acrylate, and unsaturated hydrocarbons with 2 to 8 carbon atoms such as ethylene, propene, butadiene, isoprene, 1-hexene, or 1-octene.

According to the invention, isobornyl acrylate, isobornyl methacrylate, stearyl acrylate, and methyl acrylate are particularly preferred.

The polymer dispersion can be produced by the method of emulsion polymerization of the aforementioned components. Descriptions of this method are given for example in "Emulsion Polymerization and Emulsion Polymers," by Peter A. Lovell and Mohamed S. El-Aasser, Wiley-VCH 1997, ISBN 0-471-96746-7, or in EP 1378527 B1.

According to a preferred embodiment of the invention, the polymers are composed of:
(a) 75 to 94 wt. % of n-butyl acrylate and/or 2-ethylhexyl acrylate,
(b) preferably 1 to 5 wt. % of an ethylenically unsaturated monomer with an acid or acid anhydride functional group, and
I 5 to 20 wt. % of one or a plurality of (a) different olefin monomers.

According to a further preferred embodiment of the invention, the polymers are composed of:
(a) 87 to 94 wt. % of n-butyl acrylate and/or 2-ethylhexyl acrylate,
(b) 1 to 3 wt. % of an ethylenically unsaturated monomer with an acid or acid anhydride functional group, and
I 5 to 10 wt. % of one or a plurality of (a) different olefin monomers.

In order to achieve tackiness, the adhesive compound must be heated to a processing temperature above its glass temperature in order to have viscoelastic properties. As the compound is placed in the mold at normal ambient temperature (approx. 15° C. to 25° C.), the glass transition temperature of the pressure-sensitive adhesive formulation (polymer-tackifier mixture) is preferably below +15° C. (determined by DSC (Differential Scanning calorimetry) according to DIN 53 765 at a heating rate of 10 K/min).

The glass transition temperature of the acrylate polymers can be estimated according to the equation of Fox from the glass transition temperatures of the homopolymers and their relative proportions (cf. T. G. Fox, Bull. Am. Phys. Soc. 1 (1956) 123). The tackifiers inevitably cause the glass transition temperature to increase, depending on the amount added, compatibility, and the softening temperature, by 9 pprox. 5 to 40 K. Accordingly, only acrylate polymers with a maximum glass transition temperature of 0° C. are suitable.

The use of tackifiers to increase the adhesive strength of pressure-sensitive adhesives is generally known. Improvement of adhesive strength using tackifiers is therefore obvious to the person skilled in the art. This very effect is ordinarily observed when more than 0 to 60 parts by weight of tackifiers (based on the polymer mixture) are added to the adhesive compound, usually 15 to 50 parts by weight, and even more preferably 10 to 40 parts by weight.

Generally speaking, all known substance classes are suitable for use as tackifiers, also referred to as adhesive resins. Examples of tackifiers include hydrocarbon resins (such as polymers based on unsaturated $C_5$ or $C_9$ monomers), terpene phenol resins, polyterpene resins based on raw materials such as a or β-pinene, aromatic resins such as coumarone indene resins, or resins based on styrene or α-methyl styrene such as rosin and its derivatives, e.g. disproportionated, dimerized, or esterified rosins, for example reaction products with glycol, glycerol, or pentaerythritol, to name just a few. Preferred are resins without easily oxidizable double bonds such as terpene phenol resins, aromatic resins, and particularly preferably resins produced by hydrogenation, such as hydrogenated aromatic resins, hydrogenated polycyclopentadiene resins, hydrogenated rosin derivatives, or hydrogenated polyterpene resins.

Resins based on terpene phenols and rosin esters are preferred. Adhesive resins with a softening point above 80° C. according to ASTM E28-99 (2009) are also preferred. Particularly preferred are resins based on terpene phenols and/or rosin esters with a softening point above 90° C. according to ASTM E28-99 (2009).

In order to optimize properties, the self-adhesive compound used can be mixed with one or a plurality of additives such as softeners, fillers, pigments, UV absorbers, light stabilizers, antioxidants, crosslinking agents, crosslinking promotors, or elastomers.

According to the invention, the additives comprise everything other than the polymers, adhesive resins, and crosslinking agents according to the invention.

Suitable softeners include aliphatic, cycloaliphatic, and aromatic mineral oils, di- or polyesters of phthalic acid, trimellitic acid, or adipic acid, liquid rubbers (such as nitrile or polyisoprene rubbers), liquid polymerizates of 10 pprox and/or isobutene, acrylic acid esters, polyvinyl ether, liquid and soft resins based on the raw materials of adhesive resins, lanolin and other waxes or liquid silicones.

Examples of suitable fillers and pigments are carbon black, titanium dioxide, calcium carbonate, zinc carbonate, zinc oxide, silicates, or silicic acid.

For further improvement of properties, the adhesive compound formulation can optionally be mixed with light stabilizers and/or primary and/or secondary antioxidants.

Products based on sterically hindered phenols, phosphites, thiosynergistic sterically hindered amines, or UV absorbers can be used as antioxidants.

Preferably used are primary antioxidants such as Irganox 1010 or Irganox 254, alone or in combination with secondary antioxidants such as Irgafos TNPP or Irgafos 168.

Here, the antioxidants can be used in any desired combination, with mixtures of primary and secondary antioxidants in combination with light stabilizers such as Tinuvin 213 showing a particularly favorable antioxidant effect.

Antioxidants in which a primary antioxidant is combined with a secondary antioxidant in one molecule have been found to be most particularly preferable. These antioxidants are cresol derivatives whose aromatic ring is substituted at any two different positions, preferably in the ortho and meta positions with respect to the OH group with thioalkyl chains, wherein the sulfur atom can also be bonded via one or a plurality of alkyl chains to the aromatic ring of the cresol component. The number of carbon atoms between the aromatics and the sulfur atom can be 1 to 10, and preferably 1 to 4. The number of carbon atoms of the alkyl side chain can be 1 to 25, and preferably 6 to 16. In this case, compounds of the type 4,6-bis(dodecylthiomethyl)-o-cresol, 4,6-bis(undecylthiomethyl)-o-cresol, 4,6-bis(decylthiomethyl)-o-cresol, 4,6-bis(nonylthiomethyl)-o-cresol, or 4,6-bis(octylthiomethyl)-o-cresol are particularly preferred. Such antioxidants are marketed for example by the firm Ciba Geigy under the names Irganox 1726 or Irganox 1520. In order to improve processing properties, the adhesive compound formulation can further be mixed with conventional process auxiliaries such as rheology modifiers (thickeners), defoaming agents, deaerators, wetting agents, or superplasticizers.

The total amount of additives used should preferably be 0 to 10 parts by weight, more preferably 1 to 5 parts by weight, and even more preferably 1 to 3 parts by weight (based on the weight of the polymer mixture).

Crosslinking is advantageous for improving the redetachability of the adhesive tape after use and can be carried out thermally or by irradiation with UV light or electron beams.

For the purpose of thermally induced chemical crosslinking, all known thermally activatable chemical crosslinking agents can be used, such as accelerated sulfur or sulfur donor systems, isocyanate systems, reactive melamine, formaldehyde, and (optionally halogenated) phenol formaldehyde resins, reactive phenol resins or diisocyanate crosslinking systems with the corresponding activators, epoxidized polyester and acrylate resins, and combinations thereof.

The crosslinking agents are preferably activated at temperatures above 50° C., particularly preferably at temperatures of 100° C. to 160° C., and particularly preferably at temperatures of 110° C. to 140° C.

Thermal excitation of the crosslinking agents can also be carried out by IR irradiation or high-energy alternating fields.

The pressure-sensitive adhesives can advantageously be crosslinked with metal chelates. Preferred metal chelates are those that can be represented by the formula $(R_1O)_nM(XR_2Y)_m$, where M is a metal of the $2^{nd}$, $3^{rd}$, $4^{th}$, and $5^{th}$ main group or a transition metal; $R_1$ is an alkyl or aryl group such as methyl, ethyl, butyl, isopropyl, or benzyl; n is zero or a larger whole number, X and Y are oxygen or nitrogen, which can also be double-bonded to $R_2$; $R_2$ is an alkylene group binding X and Y that may be branched or also include oxygen or further heteroatoms in the chain; and m is a whole number, but must be at least 1. Preferably, the chelate may also be an acetyl acetonate, and particularly preferably aluminum acetyl acetonate.

Examples of particularly suitable metals of the metal chelate are aluminium, tin, titanium, zirconium, hafnium, vanadium, niobium, chromium, manganese, iron, cobalt, and cerium. Aluminium and titanium are particularly preferred.

The total amount of crosslinking agents added is preferably 0 to 1 parts by weight, more preferably 0.05 to 0.75 parts by weight, and most preferably 0.1 to 0.35 parts by weight (based on the weight of the polymer mixture).

According to a further preferred embodiment of the invention, the self-adhesive compound is composed of:
  100 parts by weight of the polymer mixture,
  0 to 60 parts by weight, preferably 15 to 50 parts by weight, and more preferably 10 to 40 parts by weight of one or a plurality of tackifiers (based on the mass of the polymer mixture),
  0 to 10 parts by weight, preferably 1 to 5 parts by weight, and more preferably 1 to 3 parts by weight of additives (based on the mass of the polymer mixture), and
  0 to 1 parts by weight, preferably 0.05 to 0.75 parts by weight, and more preferably 0.1 to 0.35 parts by weight of crosslinking agents (based on the mass of the polymer mixture).

Moreover, the following variants of the self-adhesive compound are also preferred:
  100 parts by weight of the polymer mixture
  10 to 40 parts by weight of tackifiers (based on the mass of the polymer mixture)
  0 parts by weight of additives (based on the mass of the polymer mixture)
  0.05 to 0.75 parts by weight of crosslinking agents (based on the mass of the polymer mixture)
  100 parts by weight of the polymer mixture
  0 parts by weight of tackifiers (based on the mass of the polymer mixture)
  0 parts by weight of additives (based on the mass of the polymer mixture)
  0.05 to 0.75 parts by weight of crosslinking agents (based on the mass of the polymer mixture)
  100 parts by weight of the polymer mixture
  0 parts by weight of tackifiers (based on the mass of the polymer mixture)
  0 parts by weight of additives (based on the mass of the polymer mixture)
  0 parts by weight of crosslinking agents (based on the mass of the polymer mixture)

Films composed of materials such as PUR, PE or PP, PET, or PA can be used as a carrier film for the adhesive tape.

For example, uniaxially and biaxially oriented films based on polyolefins or films based on oriented polyethylene or oriented copolymers containing ethylene and/or polypropylene units can be used.

Uniaxially oriented polypropylene is characterized by its high tear resistance and low elongation in the longitudinal direction. Particularly preferred are uniaxially oriented films based on polypropylene.

Uniaxially oriented films are predominantly single-layered, but multilayer uniaxially oriented films can also be produced in principle. Known films are predominantly single, double, and three-layered films, and a larger number of layers may also be selected.

Also particularly preferred are biaxially oriented films based on polypropylene with a longitudinal draw ratio of 1:4 to 1:9, and preferably 1:4.8 to 1:6, and a transverse draw ratio of 1:4 to 1:9, and preferably 1:4.8 to 1:8.5.

Particularly preferably, a film containing one or at least two fluoropolymers is used as a carrier film.

In the framework of the present invention, and in general, the terms fluoropolymers or fluorine-containing polymers refer to both fluorine-containing polymers containing only carbon atoms and those with heteroatoms in the main chain. Representatives of the first group are homo- and copolymers of olefinically unsaturated fluorinated monomers.

The fluoropolymers produced from these monomers are classified into the categories of polytetrafluoroethylene, fluorothermoplastics, fluorine rubbers, and fluoroelastomers obtained therefrom by vulcanization. The most important representatives of fluoropolymers with heteroatoms in the main chain are the polyfluorosiloxanes and polyfluoroalkoxyphosphazenes.

The carrier film preferably contains up to 50 wt. %, more preferably up to 75 wt. %, even more preferably up to 90 wt. %, and particularly preferably up to 95 wt. % of one or at least two fluoropolymers (based in each case on the total composition of the carrier film). More preferably, the polymers making up the carrier film are composed up to 100% of one or at least two fluoropolymers. In addition, the additives described further below can optionally also be added to the fluoropolymers. The latter are not required, and—as mentioned above—need not be used.

As fluoropolymers, PTFE (polytetrafluoroethylene), ETFE (poly(ethylene-co-tetrafluoroethylene)), FEP (poly(tetrafluoroethylene-co-hexafluoropropylene)), PVDF (poly(1,1-difluorethene)), or PFA (perfluoroalkoxy polymers) are particularly suitable, or mixtures of two or more of the aforementioned fluoropolymers.

PTFE denotes fluoropolymers composed of tetrafluoroethylene monomers.

ETFE is a fluorinated copolymer composed of the monomers chlorotrifluoroethylene or tetrafluoroethylene and ethylene.

FEP, also referred to as fluorinated ethylene-propylene copolymer, denotes copolymers of tetrafluoroethylene and hexafluoropropylene.

PVF is a polymer produced from vinyl fluoride (polyvinyl fluoride).

PCTFE is a polymer composed of chlorotrifluoroethylene (polychlorotrifluoroethylene).

ECTFE is a copolymer composed of ethylene and chlorotrifluoroethylene.

PVDF denotes fluoropolymers that can be produced from 1,1-difluorethene (vinylidene fluoride). PFA denotes copolymers with groupings such as as basic units [poly(tetrafluoroethylene-co-perfluoroalkyl vinyl ether)]. PFA is also produced by copolymerization of tetrafluoroethylene and perfluoroalkoxy vinyl ethers (such as perfluorovinyl propyl ether, n=3).

The fluoropolymers can also be mixed with further polymers, with good miscibility of the fluoropolymers with the other polymers being required.

Suitable polymers include olefin polymers such as homo- or copolymers of olefins such as ethylene, propylene, or butylene (in this case, the term copolymer is to be understood correspondingly as including terpolymers), polypropylene homopolymers, or polypropylene copolymers, including block (impact) and random polymers.

Further polymers may be selected individually or in a mixture from the group of the polyesters, such as in particular polyethylene terephthalate (PET), polyamide, polyurethane, polyoxymethylene, polyvinyl chloride (PVC), polyethylene naphthalate (PEN), ethylene vinyl alcohol (EVOH), polyvinylidene chloride (PVDC), polyvinylidene fluoride (PVDF), polyacrylonitrile (PAN), polycarbonate (PC), polyamide (PA), polyether sulfone (PES), polyimide (PI), polyarylene sulfide, and/or polyarylene oxide.

The polymers for forming the carrier film may be used in pure form or in blends with additives such as antioxidants, light stabilizers, antiblocking agents, lubricants and processing auxiliaries, fillers, colorants, pigments, blowing agents, or nucleating agents. The film preferably does not contain any of the aforementioned additives, with the exception of colorants. Colorants are preferably used, but are not absolutely required.

According to a preferred embodiment, the carrier film is composed of an at least two-layered laminate comprising two or more film layers. Preferably, the multilayer carrier film is composed of up to ten film layers, and particularly preferably two to five film layers. The outermost film layer, i.e. the layer facing the material layers forming the body, is the carrier film containing one or at least two fluoropolymers. Further film layers composed of any desired material (such as polyethylene, polypropylene, polyester, PA, PVC and other films) may be located between this carrier film and the adhesive compound. The further film layers can also consist of a similar or identical material to that of the outermost film layer.

According to a preferred embodiment of the invention, the carrier film is composed of at least two film layers, wherein the two outer film layers are of different colors, and preferably of exactly two film layers.

This gives rise to a simple but clearly recognizable sign of wear. When the outermost film layer is worn through at several sites as a result of wear, the underlying film layer, which as mentioned above is of a different color, shows through at these sites (of course, the colors should be selected to as to produce a corresponding contrast). Therefore, when the underlying film layer becomes visible, this indicates that it is time to replace the adhesive tape.

According to a preferred embodiment, the thickness of the carrier film is 15 to 350 µm, preferably 30 to 200 µm, and more preferably 50 to 150 µm.

The anchorage of the self-adhesive compound according to the invention is ordinarily so strong that such an adhesive tape can be unwound from a roll without difficulty and without causing rupture of the anchorage of the adhesive compound, which leads to so-called unwinding of said compound (after which the adhesive compound is located on the reverse side of the carrier). Moreover, it is expected of most pressure-sensitive adhesive tapes that they can be detached from the substrate, i.e. taken up again as completely as possible. This means that the adhesive tape may not undergo adhesive rupture between the carrier and the adhesive compound.

According to a preferred embodiment, the mass of the adhesive compound applied to the carrier film is 10 to 200 g/m², preferably 20 to 100 g/m², and particularly preferably 30 to 75 g/m².

In a preferred embodiment, the adhesive compound formulation according to the invention has an adhesive strength on steel according to ASTM D3330 of at least 2.5 N/cm (with a weight per unit area of the adhesive compound of 16 pprox. 100 g/m² on polyester film).

In particular, fiber materials (such as GFRP (glass fiber reinforced plastic), CFRP (carbon fiber-reinforced plastic), prepreg and so forth) are used as material layers for forming the molded part.

Prepreg denotes a semi-finished material consisting of endless fibers and an uncured duroplastic matrix used primarily in light construction. The endless fibers may be in the form of a pure unidirectional layer, a fabric, or a non-crimp fabric.

In order to increase adhesion between the adhesive compound and the carrier material or between the release coating and the carrier material, the carrier material can be subjected to a corresponding corona treatment in order to increase its surface energy.

It is advantageous to use a primer coat between the carrier film and the adhesive compound in order to improve bonding of the adhesive compound to the film and thus improve ensure residue-free detachability after use.

Moreover, etching of the film is advantageous in order to allow anchoring of the adhesive compound.

Within the meaning of the present invention, the general term "adhesive tape" comprises all flat structure such as films or film sections extended in two dimensions, tapes of extended length and limited width, tape sections and the like, and finally blanks or labels.

The adhesive tape can be produced either in the form of a roll, i.e. in the form of an Archimedean spiral rolled up on itself, or covered on the adhesive side—if desired, but not necessarily—with separating materials such as siliconized paper or siliconized film.

A lint-free material such as a plastic film or a well-glued, long-fiber paper is particularly suitable as a separating material.

In particular, the adhesive tapes show running lengths of 1,000 to 30,000 m. The width of the rolls is ordinarily selected in the range of 100 to 1,000 mm.

It is surprising that acrylate adhesives also provide quite a good balance between adhesive strength and residue-free detachability. Acrylate adhesives are known under normal conditions to show only extremely poor adhesion to monopolar substrates (such as release materials). However, this minimal adhesion to the covered mold is sufficient, for example, to prepare the mold with glass wool and/or carbon fiber mats, etc. before the entire structure is sealed at the edge with film and then evaluated.

During the first production cycle, just enough adhesive force is produced to keep the adhesive tape from being torn out on demolding of the components.

The adhesive force built up in this manner becomes slightly stronger in the subsequent cycles, so that the adhesive tape adheres securely and at the end of its useful life can be released from the mold without difficulty, and without any remaining residues.

It has been found that the interplay of acrylic acid content, the degree of crosslinking of the polymer chains, and the glass transition temperature of the polymer plays a decisive role in adhesive strength.

The adhesive strength on monopolar substrates tends to increase with decreasing content of acrylic acid because of the reduction in polarity. Accordingly, the adhesive strength of a polymer containing 12 wt. % acrylic acid is sharply lower than one with a content of 1 wt. % acrylic acid. The glass transition temperature goes hand in hand with the acrylic acid content. As acrylic acid has an extremely high glass transition temperature, the total glass transition temperature of the polymer decreases with decreasing acrylic acid content. A lower glass transition temperature results in a much softer adhesive mass and thus allows much improved applicability thereof. As a result, of course, the pull-off forces increase.

A further important point is the crosslinking of the polymer chains. It has been found that polymers, which in any case already contain little acrylic acid and are additionally crosslinked, show favorable adhesive strength on monopolar substrates. Because the crosslinking takes place via acrylic acid groups, there are fewer acrylic acid groups available, which a) make the polymer more polar and b) reduce the glass transition temperature.

Furthermore, the unwind forces required to unwind the adhesive tape are sharply lower than in the case of silicone adhesives. As adhesive tape widths of 100 to 1,000 mm are usually used to line a mold, it is a decisive factor for the unwind forces to be as low as possible. Alternatively, in the case of silicone adhesives, adhesive tapes with a release liner are used, which must be previously removed (time factor) and accumulate as waste.

As acrylate adhesive compounds do not show such a marked increase in adhesive strength, the force required to remove the adhesive tape is also sharply lower.

A filmlike carrier composed entirely or up to at least 50 wt. % of fluorinated polymers still does not show the above-described drawbacks of fraying due to glass fibers or fabric. The stiffness of such an adhesive tape is also much lower, and it therefore adapts well to the shape of the mold. The carrier material shows a certain degree of elasticity, which is also beneficial in adaptation to the mold.

The inner strength of such a carrier material is also sharply higher, so that no splitting off of carrier components is observed even when the tape is subjected to strong forces.

In the following, the invention is explained in greater detail with reference to several examples, without these examples being intended to limit the scope of the invention in any way whatsoever.

EXAMPLES

Several solvent-based polymer dispersions having the following monomer composition were processed into self-adhesive compounds. The figures given for the monomers 2-ethylhexyl acrylate, butyl acrylate, acrylic acid, isobornyl acrylate, stearyl acrylate, and methyl acrylate all indicate wt. %, and crosslinking agents and adhesive resins are indicated in parts by weight based on the weight of the polymer mixture.

| Monomer / Crosslinker / Adhesive Resin | Adhesive 1 | Adhesive 2 | Adhesive 3 | Adhesive 4 | Adhesive 5 | Adhesive 6 | Adhesive 7 | Adhesive 8 | Adhesive 9 | Adhesive 10 |
|---|---|---|---|---|---|---|---|---|---|---|
| 2-ethylhexyl acrylate [Wt-%] | 49 | 70 |  | 78 | 47 | 47 | 90 | 42 | 49 | 49 |
| Butyl acrylate [Wt-%] | 49 |  | 69 | 18 | 47 | 47 |  | 42 | 49 | 49 |
| Acrylic Acid [Wt-%] | 2 | 2 | 3 | 4 | 6 | 6 | 2 | 4 | 2 | 2 |
| Isobornyl acrylate [Wt-%] |  | 28 |  |  |  |  |  |  |  |  |
| Stearyl acrylate [Wt-%] |  |  | 18 |  |  |  |  | 8 |  |  |
| Methyl acrylate [Wt-%] |  |  |  |  |  |  |  |  | 12 |  |
| Al-Chelate [Parts by weight] | 0.75 |  |  | 0.35 |  |  |  |  |  |  |
| Erisys GA240 [Parts by weight] |  | 0.05 | 0.05 |  | 0.075 | 0.05 | 0.075 |  |  |  |
| S610 [Parts by weight] |  |  |  |  |  |  |  |  | 0.1 |  |
| Adhesive resin [Parts by weight] |  |  |  |  | 40 | 10 |  | 30 |  |  |

Sylvares TP 95® is a terpene phenol resin having a softening temperature of 92 to 98° C. (typical value 95° C.; manufacturer information) (Arizona Chemical).

ERISYS GA-240 is a tetrafunctional epoxy based on tetraglycidyl metaxylene diamine (CAS No.: 63738-22-7).

S610 is an aliphatic-based tetrafunctional epoxy (CAS No.: 65992-66-7).

50 g/m² each of the adhesive compounds shown in the table is applied to a 100 µm PTFE carrier (NORTON® 124 sintered extruded PTFE film), and the carrier is activated by means of a conventional etching process.

Alternatively, 50 g/m² each of the adhesive compounds shown in the table is applied to a 150 µm PTFE-coated glass fabric, and the carrier is again activated by means of a conventional etching process.

Comparison Example 1

50 g/m² of silicone adhesive compound (Dow Corning® Q2-7406)
100 m of PTFE carrier (NORTON® 124 sintered extruded PTFE film) (carrier)
Activation of the carrier (by a conventional etching process)

The adhesive tapes are bonded into a mold equipped with a conventional release agent, e.g. Frekote NC 44 (a release agent containing a mixture of dibutyl ether and polydimethylsiloxane (PDMS), which is a mixture of fully methylated linear siloxane polymers having terminal trimethyl siloxane units) or ME 143 produced by the firm Miller Stephenson (a solvent-based suspension of low-molecular weight PTFE). In accordance with FIG. 1, multiple production cycles are carried out. The temperature during curing is 80 to 90° C. The vacuum is 0.1 bar. Up to 10 production cycles are simulated.

The adhesive tapes according to the invention can be detached virtually residue-free from the substrate even after numerous demolding steps and continue to show a favorable separating effect throughout the entire period.

In the case of a glass fabric carrier, splitting of the carrier in the z direction is observed after more than 30 cycles, i.e. the carrier itself splits, and a partial layer of PTFE is left on the surface that can only be removed with difficulty. However, this long service life is largely sufficient in normal operation.

In the comparison example, on detachment of the adhesive tape, residues of the adhesive compound on the mold are already observed after the first cycle. After three to five cycles, these residues are so extensive that treatment is required.

In the following, the method according to the invention is explained by way of example in further detail with reference to several figures, but without limiting the invention to these embodiments.

Figure 1:
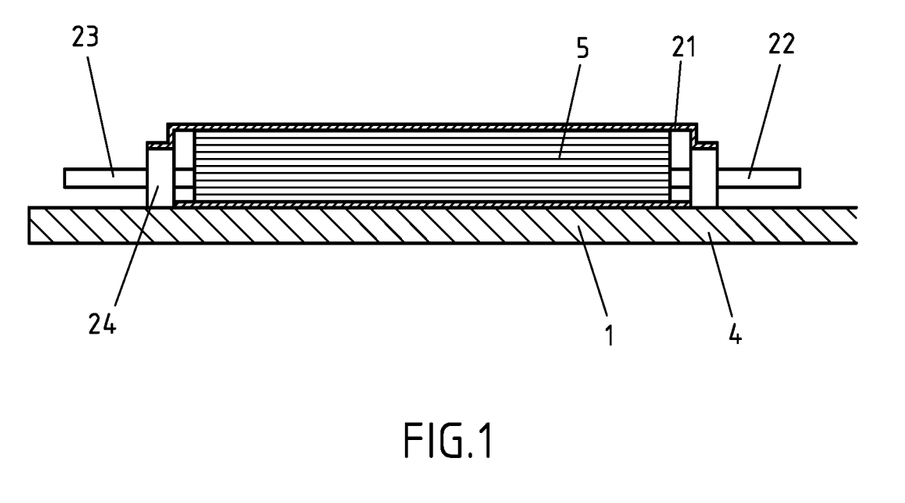
FIG. 1 shows the arrangement of the individual layers in the mold in a side view.
Figure 2:
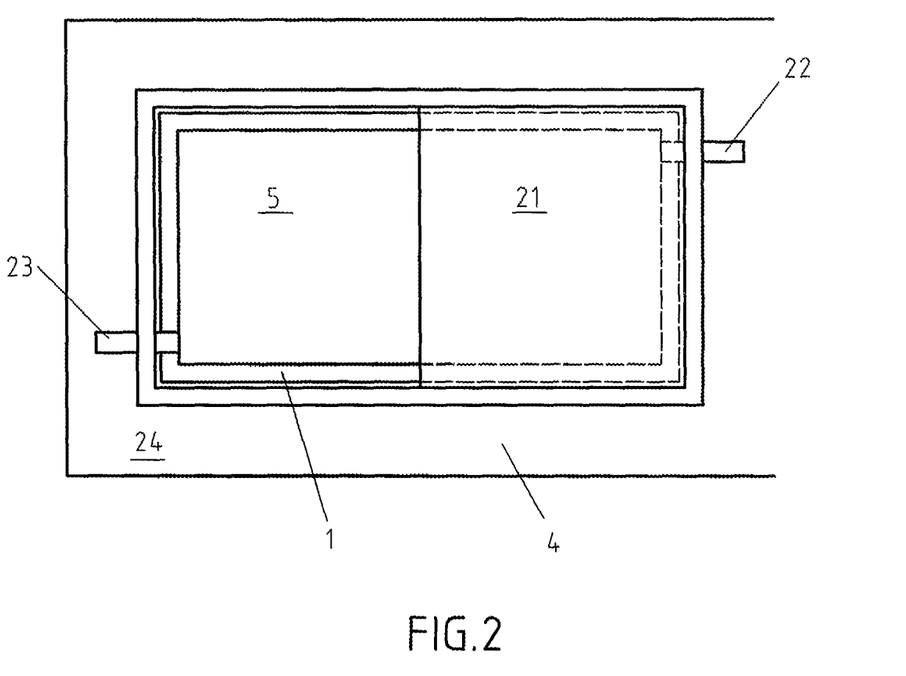
FIG. 2 shows the arrangement of the individual layers in the mold from above.

The arrangement of the individual layers in the mold is shown in a side view in FIG. 1 and from above in FIG. 2.

The mold 4 is equipped with an extremely thin layer measuring only few µm in thickness of a release agent 6, for example a solvent-based suspension of low-molecular weight PTFE, whose thickness is not shown in FIG. 1 in the correct proportions. Application is carried out using a cloth. The suspension then dries, resulting in an extremely thin film. After this, the adhesive tape 1 is applied in one layer to the inside of the mold 4.

Figure 3:
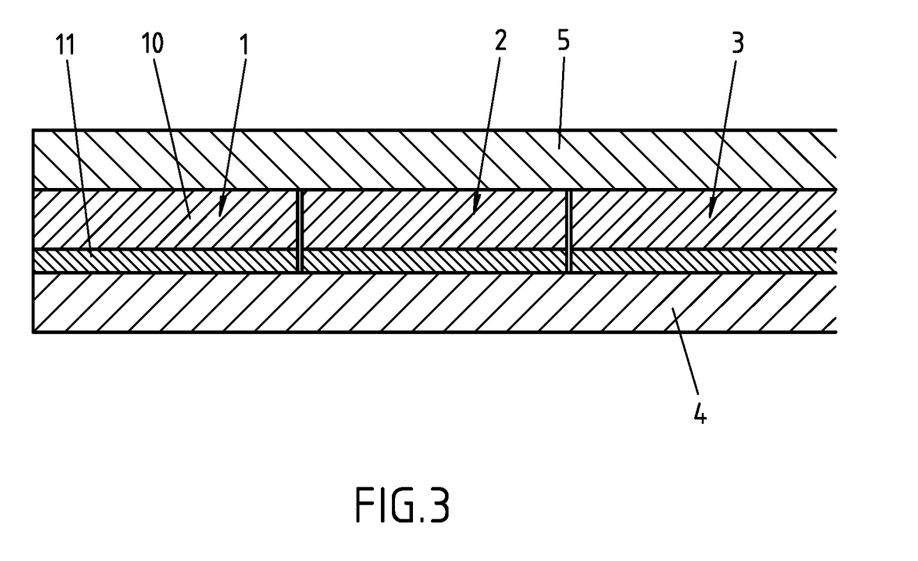
FIG. 3 shows a simplified detail section of FIG. 1.

FIG. 3 shows that the edges of the individual strips of the adhesive tape 1, 2, 3 are placed adjacent to one another, thus not showing any intervals. The individual adhesive tape sections 1, 2, 3 are composed of a carrier film 10 to which an adhesive layer 11 is applied.

After bonding of the adhesive tape 1, the material layers forming the body 5 are distributed over the adhesive tape.

After this, a sealing film 21 is fixed over the material 5 by means of a second adhesive tape 24 in such a way that a sealed space is produced.

In FIG. 2, only half of the protective film 21 is shown. The protective film 21 is fixed on the mold 4 by the second adhesive tape 24.

The air is removed via an outlet 22. The resin is supplied to the material layers 5 via an inlet 23 until they are saturated.

This is followed by the curing process.

When said process is completed, the sealing film 21 is removed, and the finished formed pieces can be removed from the mold 4.

The invention claimed is:

1. Method for molding a body in a mold, comprising the following steps:
    application of an adhesive tape to the inside of a mold,
    distribution of the material layers forming the body on the adhesive tape,
    curing the material layers, and
    removal of the body from the mold,
    wherein the adhesive tape has a carrier film, on one side of which a self-adhesive compound is applied in the form of a polymer mixture, wherein the polymers are composed of the following:
    (a) 60 to 99.5 wt. % of n-butyl acrylate and/or 2-ethylhexyl acrylate,
    (b) 0.5 to 10 wt. % of an ethylenically unsaturated monomer with an acid or acid anhydride functional group, and
    (c) 0 to 30 wt. % of one or a plurality of (a) various olefin monomers,
    and the self-adhesive compound contains 0 to 60 parts by weight of one or a plurality of tackifiers based on the mass of the polymer mixture.

2. Method according to claim 1, wherein (a) comprises a mixture of 2-ethylhexyl acrylate and n-butyl acrylate.

3. Method according to claim 1, wherein monomer (b) is acrylic acid, methacrylic acid, itaconic acid, maleic acid, fumaric acid and/or maleic acid anhydride.

4. Method according to claim 1, wherein the monomers (c) are selected from the group consisting of alkyl(meth)acrylates, other than the monomers forming (a), $C_1$ to $C_{10}$ hydroxyalkyl(meth)acrylates, and unsaturated hydrocarbons with 2 to 8 carbon atoms.

5. Method according to claim 1, wherein the polymers are composed of
a) 75 to 94 wt. % of n-butyl acrylate and/or 2-ethylhexyl acrylate,
b) 1 to 5 wt. % of an ethylenically unsaturated monomer with an acid or acid anhydride functional group, and
c) 5 to 20 wt. % of one different olefin monomer or a plurality of different olefin monomers.

6. Method according to claim 1, wherein the polymers are composed of
a) 87 to 94 wt. % of n-butyl acrylate and/or 2-ethylhexyl acrylate,
b) 1 to 3 wt. % of an ethylenically unsaturated monomer with an acid or acid anhydride functional group, and
c) 5 to 10 wt. % of one or a plurality of (a) different olefin monomers.

7. Method according to claim 1, wherein the self-adhesive compound contains 15 to 50 parts by weight of one or a plurality of tackifiers based on the mass of the polymer mixture.

8. Method according to claim 1, wherein films composed of PUR, PE, PP, PET or PA are used as carrier films.

9. Method according to claim 1, wherein the carrier film contains one or at least two fluoropolymers.

10. Method according to claim 9, wherein the carrier film contains up to 50 wt. % of one or at least two fluoropolymers based on the total composition of the carrier film or the polymers making up the carrier film are composed up to 100% of one or at least two fluoropolymers.

11. Method according to claim 9, wherein as fluoropolymers, PTFE (polytetrafluoroethylene), ETFE (poly(ethylene-co-tetrafluoroethylene)), FEP (poly(tetrafluoroethylene-co-hexafluoropropylene)), PVF (polyvinyl fluoride), PCTFE (polychlorotrifluoroethylene), ECTFE (poly(ethylene-co-chlorotrifluoroethylene), PVDF (poly(1,1-difluorethene)), PFA (perfluoroalkoxy polymers), or mixtures of two or more of the aforementioned fluoropolymers are used.

12. Method according to claim 11, wherein the fluoropolymers are mixed with further polymers.

13. Method according to claim 1, wherein the thickness of the carrier film is 15 to 350 μm.

14. Method according to claim 1, wherein the carrier film is composed of an at least two-layered laminate comprising two or more film layers.

15. Method according to claim 1, wherein the carrier film is composed of at least two film layers, wherein the two outer film layers are of different colors.

16. Method according to claim 1, wherein the mass of the adhesive compound applied to the carrier film is 10 to 200 $g/m^2$.

17. Method according to claim 1, wherein the inside of the mold is equipped with a release agent before application of the adhesive tape.

18. Method according to claim 1, wherein curing of the material layers is carried out in a vacuum.

19. Method according to claim 3, wherein monomer b is acrylic acid, methacrylic acid or a mixture thereof.

* * * * *